United States Patent
Choi et al.

(10) Patent No.: US 7,294,794 B2
(45) Date of Patent: Nov. 13, 2007

(54) BUTTON INPUT APPARATUS WITH DISPLAY FUNCTION AND PORTABLE ELECTRONIC DEVICE HAVING THE SAME

(75) Inventors: Chang-kyu Choi, Seongnam-si (KR); Seong-woon Kim, Yongin-si (KR); Sungi Hong, Hwaseong-si (KR); Jun-ho Park, Hwaseong-si (KR); Kwangil Hwang, Suwon-si (KR); Hongseok Yang, Seongnam-si (KR); Yillmyung Yim, Seoul (KR); Yeun-bae Kim, Seongnam-si (KR); Namwoo Kim, Hanam-si (KR); Byungin Yoo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/497,292

(22) Filed: Aug. 2, 2006

(65) Prior Publication Data

US 2007/0029172 A1   Feb. 8, 2007

(30) Foreign Application Priority Data

Aug. 4, 2005  (KR) .................. 10-2005-0071394
Apr. 13, 2006 (KR) .................. 10-2006-0033538
May 29, 2006 (KR) .................. 10-2006-0048305

(51) Int. Cl.
*H01H 13/02* (2006.01)

(52) U.S. Cl. .................. 200/5 A; 200/314; 341/23; 345/168

(58) Field of Classification Search ............ 200/5 A, 200/517, 310–317, 341–345; 341/22, 23; 345/156, 157, 168

See application file for complete search history.

(56) References Cited

U.S. PATENT DOCUMENTS 5,703,625 A * 12/1997 Snider et al. ............... 345/168

(Continued)

FOREIGN PATENT DOCUMENTS

JP           9-198176        7/1997

OTHER PUBLICATIONS

"Details: Apple files major chameleonic iPod touch display patent", Oct. 26, 2006, http://www.macnn.com/blogs/?p=136 (nine-page article).

(Continued)

*Primary Examiner*—Elvin Enad
*Assistant Examiner*—M. Fishman
(74) *Attorney, Agent, or Firm*—Staas & Halsey LLP (57) ABSTRACT

A button input apparatus with a display function, which generates a switch signal in response to a user's press, and a portable electronic device having the same. The button input apparatus includes: a plurality of lever buttons each having a transparent window in at least a portion thereof, and one fixed edge on one side of the transparent window, so that the buttons are elastically vertically flexible; a switch substrate, which is disposed below the plurality of lever buttons, including openings respectively corresponding to the transparent windows, and generating a switch signal according to a motion of any of the plurality of lever buttons via a plurality of switches disposed to respectively correspond to elastic parts of the lever buttons; and a display panel, which provides an image in an area corresponding to each of the transparent windows, at least a portion of the display panel being disposed below the plurality of lever buttons.

32 Claims, 8 Drawing Sheets

U.S. PATENT DOCUMENTS

| | | |
|---|---|---|
| 5,914,676 A | 6/1999 | Akpa .......................... 341/23 |
| 6,256,020 B1 | 7/2001 | Pabon et al. ................. 345/172 |
| 6,344,622 B1 * | 2/2002 | Takiguchi et al. ........... 200/314 |
| 6,628,245 B2 | 9/2003 | Ogawa et al. |
| 6,660,948 B2 | 12/2003 | Clegg et al. |
| 6,737,596 B1 * | 5/2004 | Hein ........................... 200/310 |
| 6,798,359 B1 | 9/2004 | Ivancic ........................ 341/23 |
| 6,842,170 B1 | 1/2005 | Akins et al. |
| 7,129,432 B2 * | 10/2006 | Fujii et al. .................. 200/314 |
| 2006/0197753 A1 | 9/2006 | Hotelling .................... 345/173 |
| 2006/0238517 A1 | 10/2006 | King et al. .................. 345/173 |

OTHER PUBLICATIONS

PCT International Search Report, mailed Nov. 16, 2006, and issued in corresponding International Application No. PCT/KR2006/003048 in the English Language.

* cited by examiner

BUTTON INPUT APPARATUS WITH DISPLAY FUNCTION AND PORTABLE ELECTRONIC DEVICE HAVING THE SAME

CROSS-REFERENCE TO RELATED APPLICATIONS

This application claims the benefit of Korean Patent Application No. 10-2005-0071394, filed on Aug. 4, 2005, No. 10-2006-0033538, filed on Apr. 13, 2006 and No. 10-2006-0048305, filed on May 29, 2006 in the Korean Intellectual Property Office, the disclosures of which are incorporated herein by reference.

BACKGROUND OF THE INVENTION

1. Field of the Invention

The present invention relates to a button input apparatus with a display function and a portable electronic device having the same, and more particularly, to a button input apparatus with a display function, which displays images via windows included in a plurality of lever buttons disposed over a display panel and provides a user with a good sense of input in spite of its thinness, and a portable electronic device having the button input apparatus.

2. Description of Related Art

In general, a button input apparatus generates a switch signal in response to a user's press of a button and outputs the generated switch signal. When a user presses a button, the button input apparatus senses the user's input via an elastic member which moves downward and is then restored to its initial position. A dome shaped metal is usually used as the elastic member.

Recently, button input apparatuses having a display function have been suggested. However, when a button input apparatus is thin, it is difficult to provide a user with a good sense of input, and when a button input apparatus is thick, although a user has a good sense of input, it is difficult to assemble the button input apparatus due to its thickness and/or due to a complex structure thereof.

BRIEF SUMMARY

An aspect of the present invention provides a button input apparatus with a display function, the button input apparatus being thin and providing a good sense of input.

An aspect of the present invention also provides a portable electronic device having the button input apparatus.

According to an aspect of the present invention, there is provided a button input apparatus with a display function, which generates a switch signal in response to a user's press of a button, the apparatus including: a plurality of lever buttons each having a transparent window in at least a portion thereof, and one fixed edge on one side of the transparent window, so that the buttons are elastically vertically flexible; a switch substrate, which is disposed below the plurality of lever buttons, including openings respectively corresponding to the transparent windows, and generating a switch signal according to a motion of any of the plurality of lever buttons via a plurality of switches disposed to respectively correspond to elastic parts of the lever buttons; and a display panel, which provides an image in an area corresponding to each of the transparent windows, at least a portion of the display panel being disposed below the plurality of lever buttons.

The plurality of lever buttons may include: a plurality of individually separated buttons; and an elastic plate, which is a plate shaped member disposed below the plurality of buttons and comprises a plurality of elastic parts, a portion of the elastic plate that corresponds to the plurality of buttons being partially cut, and each of the plurality of elastic parts having an opening corresponding to each of the transparent windows. Each of the plurality of elastic parts may include a free edge partially cut along an outline of each button and a fixed uncut edge, wherein when the button is pressed, the free edge moves. The elastic plate may be a metal, plastic, or rubber plate.

The plurality of lever buttons may include a single button plate, the single button plate being partitioned into a plurality of button areas, one edge of each button area being fixed and other edges thereof being partially cut. The plurality of lever buttons may further include a button pad, which is disposed below the button plate and has a plurality of openings respectively corresponding to the transparent windows of the plurality of lever buttons. A plurality of protrusions respectively corresponding to the plurality of switches may be disposed on the rear surface of the button pad.

The plurality of lever buttons may include: a plurality of individually separated buttons; and a support structure supporting a fixed edge of each of the plurality of buttons. The plurality of lever buttons may further include a button pad, which is disposed below the plurality of buttons and has a plurality of openings respectively corresponding to the transparent windows of the plurality of lever buttons, wherein the support structure is a portion of a switch substrate, which is disposed below the button pad and supports parts of the button pad corresponding to the fixed edges of the plurality of buttons. A plurality of protrusions respectively corresponding to the plurality of switches may be disposed on the rear surface of the button pad.

The switch substrate may be disposed between the plurality of lever buttons and the display panel and have openings respectively corresponding to the windows of the plurality of lever buttons. The apparatus may further include a reinforcement plate, which is disposed between the switch substrate and the display panel, has openings respectively corresponding to the transparent windows, and protects the display panel by supporting the rear surface of the switch substrate.

The switch substrate may be disposed adjacently to the perimeter of the display panel. The apparatus may further include a reinforcement structure, which is disposed below the switch substrate and supports the rear surface of the switch substrate.

According to another aspect of the present invention, there is provided a portable electronic device including: a plurality of lever buttons each having a transparent window in at least a portion thereof, and one fixed edge so that buttons are elastically vertically biased; a switch substrate, which is disposed below the plurality of lever buttons, including openings respectively corresponding to the windows, and generating a switch signal according to a motion of any of the plurality of lever buttons via a plurality of switches disposed to respectively correspond to elastic parts of the lever buttons; a display panel, which provides an image in an area corresponding to each of the transparent windows, at least a portion of the display panel being disposed below the plurality of lever buttons; and a button display controller displaying images changed according to the switch signal in areas of the display panel corresponding to the transparent windows.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
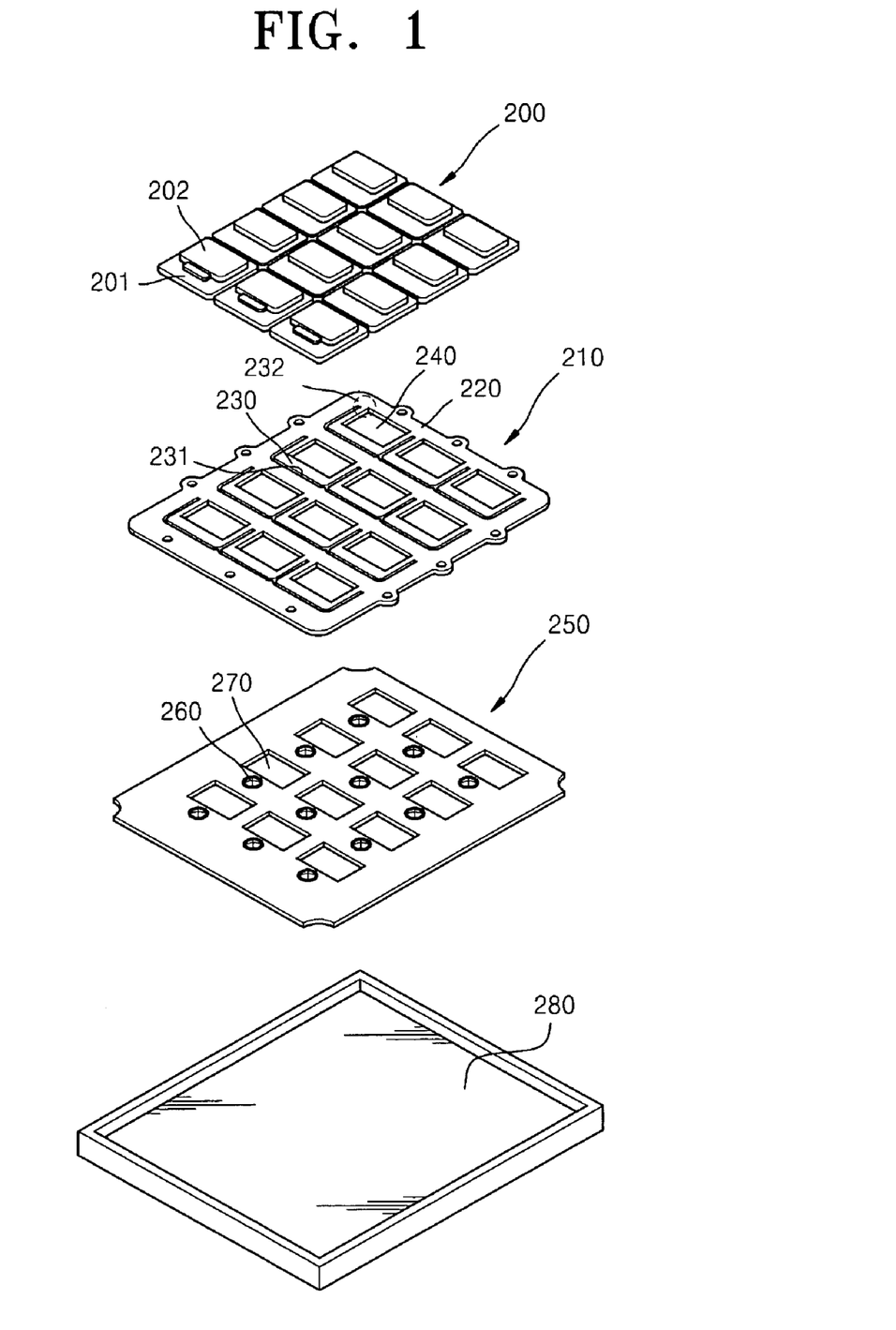
FIG. 1 is an exploded perspective view of a button input apparatus with a display function according to an embodiment of the present invention.

FIG. 1 is an exploded perspective view of a button input apparatus with a display function according to an embodiment of the present invention. The button input apparatus illustrated in FIG. 1 includes a keypad 200 in which a plurality of buttons 201 are disposed at the same level, an elastic plate 210 disposed below the keypad 200, a switch substrate 250 disposed below the elastic plate 210, and a display panel 280 disposed below the switch substrate 250. In the current embodiment, the plurality of buttons 201 are individual lever buttons and the elastic plate 210 has a plurality of elastic parts 230 respectively corresponding to the plurality of buttons 201.

Each of the plurality of buttons 201 includes a transparent window 202 formed of, by way of non-limiting example, a transparent plastic substance. The rest of the button 201 can be made of, by way of non-limiting example, a plastic or metal substance.

The elastic plate 210 is disposed below the keypad 200. The elastic plate 210 includes the plurality of elastic parts 230 formed by partially cutting a portion corresponding to the plurality of buttons 201, and each elastic part 230 has an opening 240 corresponding to the transparent window 202. When one of the buttons 201 is pressed, a bottom portion of the pressed button 201 pushes a free edge 231 of one of the corresponding elastic parts 230, resulting in bending of the elastic part 230 with respect to a fixed edge 232 so that an elastic force is applied to the pressed button 201.

The elastic plate 210 can be made of, by way of non-limiting examples, a metal, plastic, or rubber plate having good bending elasticity. Since the button input apparatus with a display function should be thin, the elastic plate 210 should be thin, and stress must be concentrated on the fixed edge 232 having a narrow width due to the opening 240. Thus, the elastic plate 210 may be made of a metal plate having high strength and long lifespan. Examples of the material of the metal plate are stainless steel, an aluminum alloy, and a magnesium alloy, among others.

The switch substrate 250 includes a plurality of openings 270 respectively corresponding to the windows 202 and can include a plurality of switches 260 disposed to correspond to surroundings of the windows 202 of the buttons 201, in more detail, to the free edges 231 of the elastic parts 230. For the switches 260, any type of switch which can sense a contact with the free edge 231 can be used. In the current embodiment, each of the switches 260 may be, by way of non-limiting example, an elastic dome switch, which includes a dome type elastic member at the outside and a carbon contact (not shown) inside the dome.

At least a portion of the display panel 280, e.g., a portion for displaying images projected through the plurality of buttons 201 having the windows 202, is disposed below the switch substrate 250. In other words, the display panel 280 may be separately prepared for the display function, or a portion of a main display panel of an electronic device may be disposed below the switch substrate 250 to perform the display function.

For a user to see images displayed on the display panel 280, the windows 202 of the buttons 201 are made of a transparent substance, and the openings 240 and 270 of the elastic plate 210 and the switch substrate 250, respectively, are disposed in series with the windows 202 in a vertical direction.

Operations of the keypad 200, the elastic plate 210, and the switch substrate 250 to generate a switch signal in response to a user's press will now be described. When the user presses one of the buttons 201 included in the keypad 200, the elastic part 230 located below the pressed button 201 is bent based with respect to the fixed edge 232 fixed to a frame 220, and the free edge 231 is pushed due to the pressure. The keypad 200 may be made of a plastic material, and the elastic plate 210 may be made of a plastic or metal plate having good bending elasticity. In particular, in order to provide a sufficient elastic force when the button input apparatus is thin, the elastic plate 210 may be made of a stainless steel, an aluminum alloy, and a magnesium alloy, among other metals.

When the elastic part 230 is bent, one of the switches 260 included in the switch substrate 250 and located below the bent elastic part 230 is pressed, and the switch substrate 250 generates a switch signal corresponding to the pressed switch 260. A value of the switch signal corresponding to the pressed switch 260 may be "1".

When the user releases the pressed button 201, the bent elastic part 230 is restored to its initial position, resulting in restoring the pressed switch 260 to its initial position. According to the restoration of the switch 260 to the initial position, the value of the switch signal corresponding to the pressed switch 260 may be "0".

A portable electronic device having the button input apparatus with a display function according to an embodiment of the present invention further includes a display controller (not shown) providing images changed according to the switch signal described above. The display controller may divide the display panel 280 into the same number of areas as buttons 201 included in the keypad 200 and display an image in each of the divided areas. The plurality of images displayed on the display panel 280 are respectively displayed on the buttons 201 through the openings 270 of the switch substrate 250, the openings 240 of the elastic plate 210, and the transparent windows 202.

Figure 2:
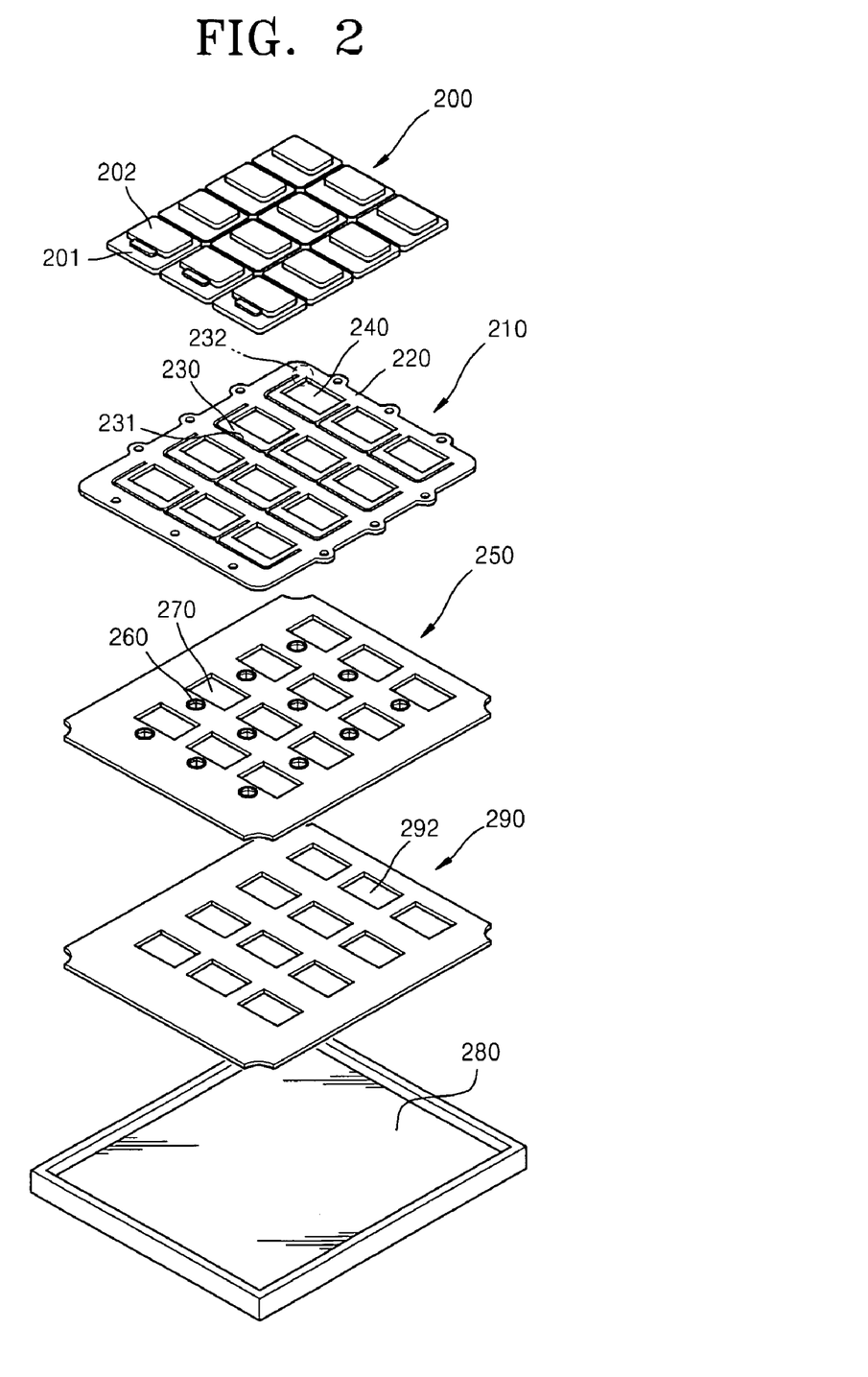
FIG. 2 is an exploded perspective view of a button input apparatus with a display function according to another embodiment of the present invention.

FIG. 2 is an exploded perspective view of a button input apparatus with a display function according to another embodiment of the present invention.

The button input apparatus illustrated in FIG. 2 is similar to the button input apparatus illustrated in FIG. 1 in various aspects. However, the button apparatus of FIG. 2 includes a reinforcement plate 290 supporting a rear surface of the switch substrate 250 and protecting the display panel 280 between the switch substrate 250 and the display panel 280. The reinforcement plate 290 includes openings 292 corresponding to the windows 202 of the buttons 201, as well as the openings of the elastic plate 210 and the switch substrate 250.

Figure 3:
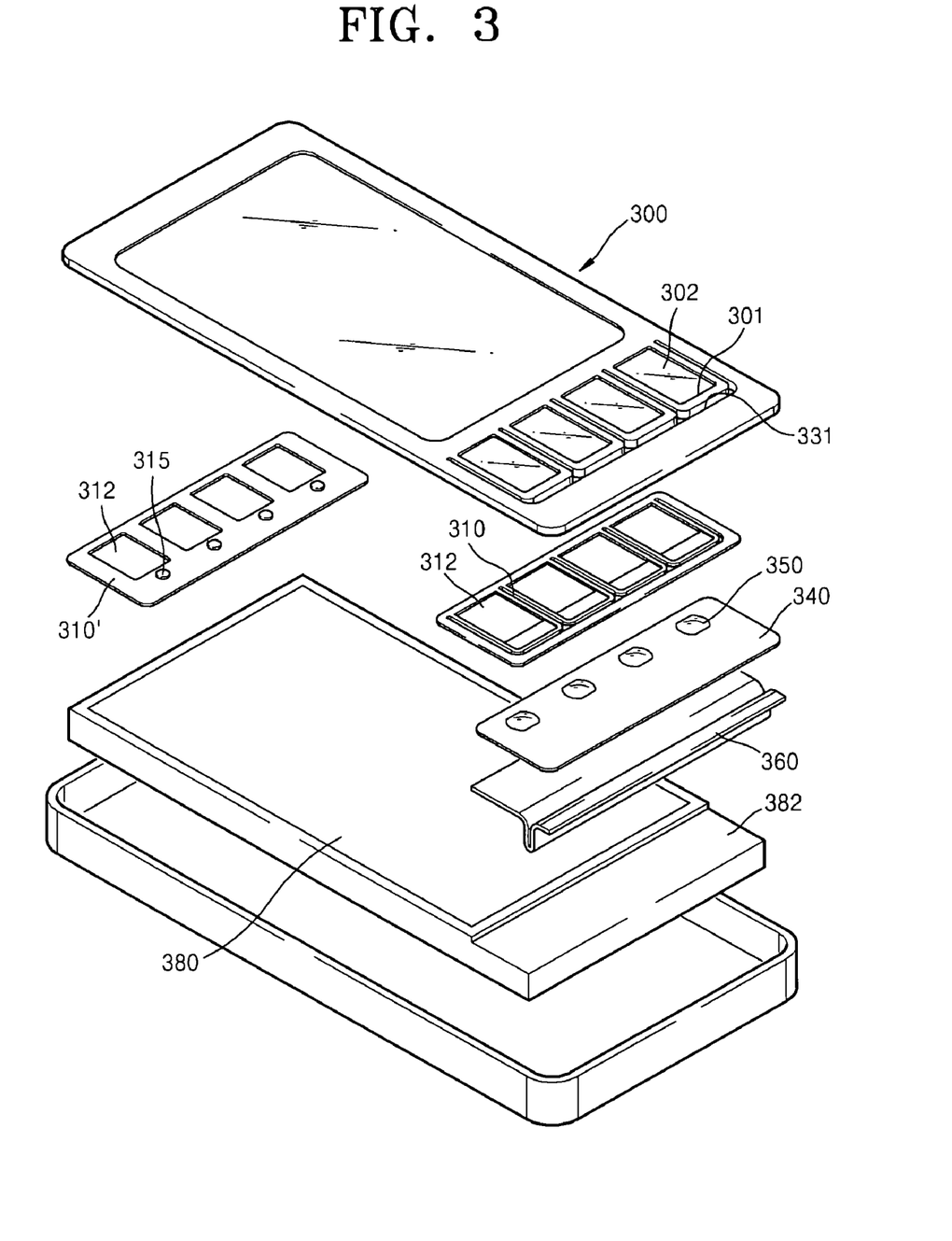
FIG. 3 is an exploded perspective view of a button input apparatus with a display function according to another embodiment of the present invention.

FIG. 3 is an exploded perspective view of a button input apparatus with a display function according to another embodiment of the present invention. The button input apparatus illustrated in FIG. 3 includes a plurality of lever buttons 301 disposed in a portion of a single button plate 300. The button plate 300 may be a front cover for covering a main display area of a portable electronic device. The button plate 300 is partitioned into a plurality of button areas, and one edge of each button area s fixed while the other edges thereof are partially cut so that each of the free edges 331 is elastically movable. Each of the plurality of lever buttons 301 includes a transparent window 302, and a button pad 310 may be attached to a rear surface of the plurality of lever buttons 301. The button pad 310 includes openings 312 respectively corresponding to the windows 302. The button pad 310 can be made of a substance such as, by way of non-limiting examples, silicon or urethane in order to provide a sense of cushion in an operation of the lever buttons 301 and prevent an inflow of a foreign substance through the cut portion.

A switch substrate 340 including a plurality of switches 350 disposed to correspond to a pressing portion surrounding the windows 302, i.e., the free edges 331, is disposed below the lever buttons 301. A plurality of protrusions 315 respectively corresponding to the plurality of switches 350 is included on the rear surface 310' of the button pad 310. In this case, the switches 350 may be, by way of non-limiting example, elastic dome switches which can be pressed downward due to an operation of the buttons 301 and then restored to their initial positions. A carbon contact (not shown) may be included in the dome type structure having elasticity, and a metal is usually used as a material of the dome type structure. However, the switches 350 are not limited to the dome switch and other press sensitive switches ma be used.

A display panel 380 is disposed below the switch substrate 340. In addition, a reinforcement structure 360 supporting the rear surface of the switch substrate 340 may be disposed below the switch substrate 340. The switch substrate 340 may be disposed on an area 382 adjacent to the perimeter of the display panel 380. In this case, an edge area of the inner part of the display panel 380 can be projected through the windows 302 of the buttons 301, and the free edges 331 of the buttons 301 can correspond to the switches 350 disposed on the switch substrate 340.

The button input apparatus illustrated in FIG. 3 may further include a display controller (not shown) providing images changed according to a switch signal. The display controller may divide the display panel 380 into a main display area and a button display area, and in more detail, in the same number of areas as the buttons 301, and display an image in each of the divided areas. The plurality of images displayed on the button display area are respectively displayed on the buttons 301 through the openings 312 of the button pad 310 and the transparent windows 302.

Figure 4:
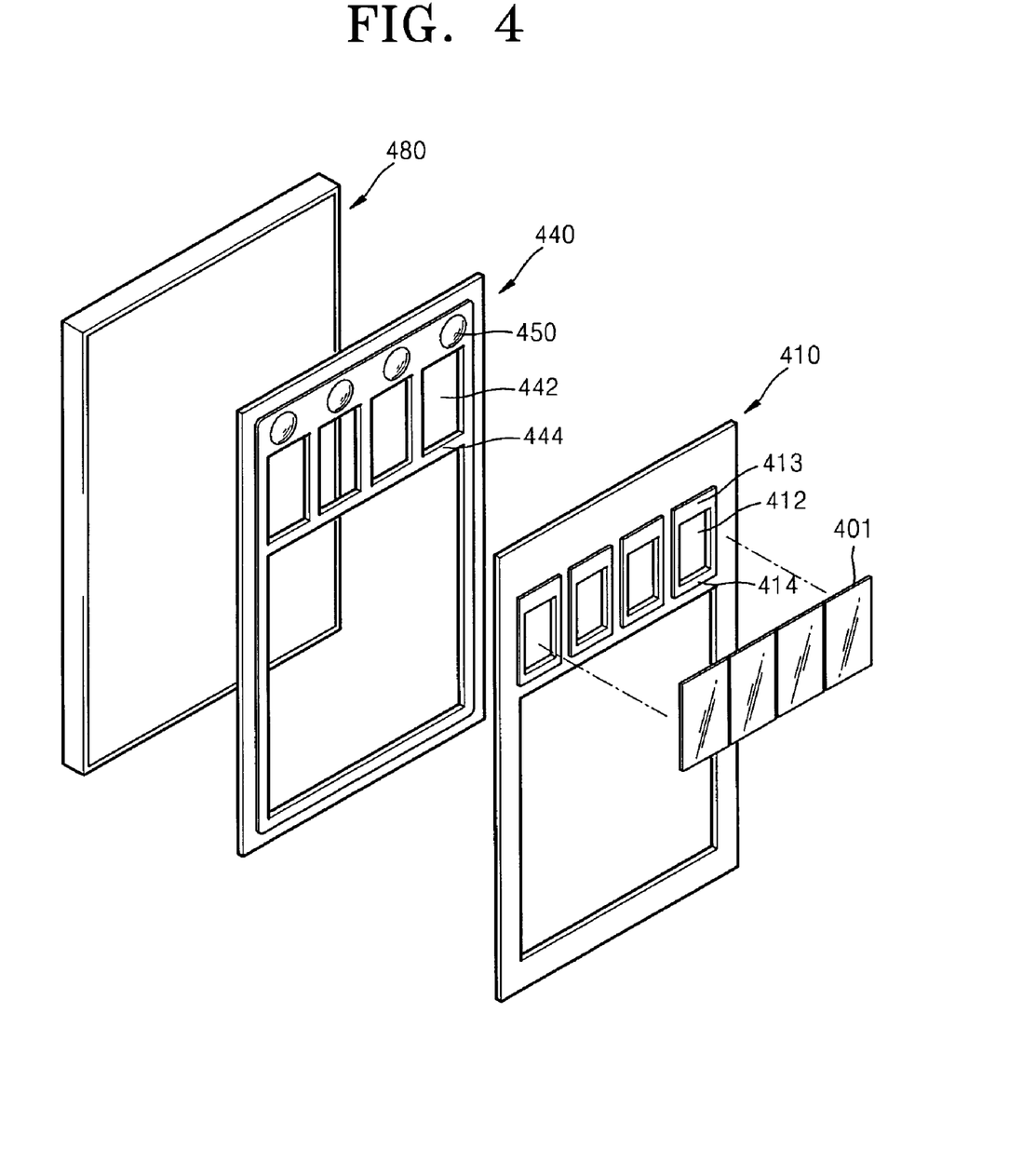
FIG. 4 is an exploded perspective view of a button input apparatus with a display function according to another embodiment of the present invention.

FIG. 4 is an exploded perspective view of a button input apparatus with a display function according to another embodiment of the present invention. In the current embodiment, lever buttons may include a plurality of individually separated buttons 401 and a support structure supporting each fixed edge of the plurality of buttons 401. The lever buttons may further include a button pad 410 disposed below the plurality of buttons 401. The support structure is a portion 444 of a switch substrate 440 is disposed below the button pad 401 and supporting a portion 414 of the button pad 410, which corresponds to each fixed edge of the plurality of buttons 401.

The plurality of buttons 401 may be made of, by way of non-limiting example, a transparent plastic plate and include a transparent window (not shown) in at least a portion thereof. In addition, the button pad 410 includes openings 412 respectively corresponding to the windows. The button pad 410 can be made of a material such as, by way of non-limiting examples, silicon or urethane in order to provide a sense of cushion in an operation of the buttons 401 and prevent an inflow of a foreign substance through gaps in the surroundings of the buttons 401. A plurality of protrusions (not shown) respectively corresponding to a plurality of switches 450 on the switch substrate 440 can be disposed on the rear surface of the button pad 410.

The switch substrate 440 can be disposed between the button pad 410 and a display panel 480. In this case, the switch substrate 440 may include openings 442 respectively corresponding to the windows of the buttons 401 and the openings 412 of the button pad 410. A reinforcement plate for protecting the display panel 480 can be disposed on the rear surface of the switch substrate 440.

An operation of the lever buttons according to the current embodiment will now be described. When a user presses one of the buttons 401, surrounding portions 413 and 414 of a relevant opening 412 included in the button pad 410 is pressed. One portion 414 is supported by the corresponding portion 444 of the switch substrate 440, which is disposed on the rear surface of the button pad 410, and the other portion 413 presses the switch 450 disposed on a corresponding portion of the switch substrate 440.

Figure 5:
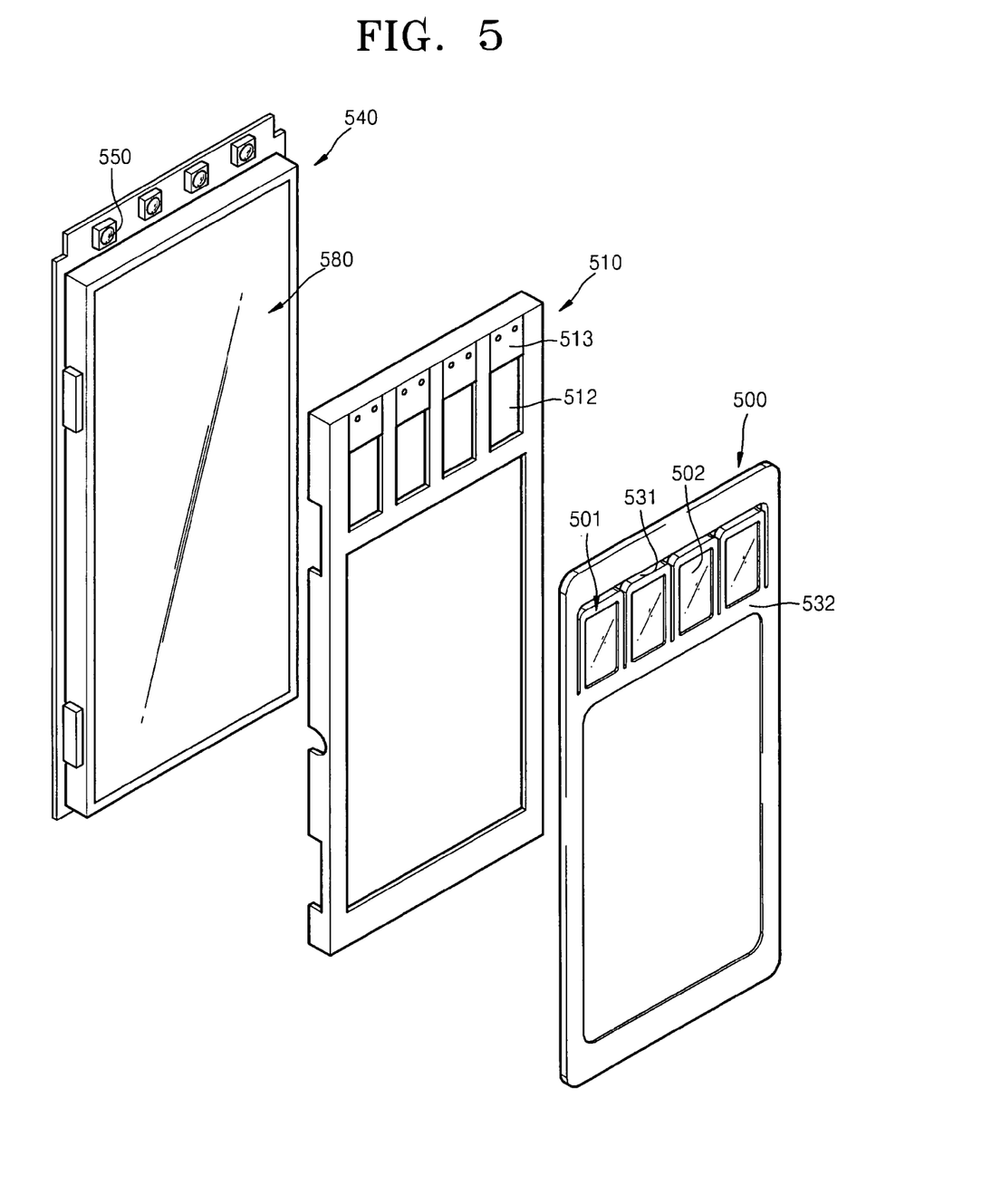
FIG. 5 is an exploded perspective view of a button input apparatus with a display function according to another embodiment of the present invention.

FIG. 5 is an exploded perspective view of a button input apparatus with a display function according to another embodiment of the present invention. The button input apparatus illustrated in FIG. 5 includes a plurality of lever buttons 501 disposed in a portion of a single button plate 500. The button plate 500 may be a front cover for covering a main display area of a portable electronic device. The button plate 500 is partitioned into a plurality of button areas, one edge 532 of each button area being fixed and other edges thereof being partially cut so that each free edge 531 moves elastically. Each of the plurality of lever buttons 501 includes a transparent window 502, and a button pad 510 can be attached to the rear surface of the plurality of lever buttons 501. The button pad 510 includes openings 512 respectively corresponding to the windows 502. The button pad 510 can be made of a material such as silicon or urethane in order to provide a sense of cushion in an operation of the lever buttons 501 and prevent an inflow of a foreign substance through the cut portion of the button plate 500.

A display panel 580 is disposed below the lever buttons 501, and switches 550 can be disposed adjacently to the perimeter of the display panel 580. Herein, a switch substrate 540 may be formed in one body with a printed circuit board (PCB) driving the display panel 580. The windows 502 of the lever buttons 501 correspond to the display area of the display panel 580, and a pressed portion, i.e., the free edges 531, of a surrounding portion of the windows 502 corresponds to the switches 550 disposed adjacently to the perimeter of the display panel 580. A plurality of protrusions (not shown) respectively corresponding to the switches 550 can be disposed on the rear surface of the button pad 510. In this case, if one of the switches 550 is pressed due to an operation of a corresponding button 501 and released, the pressed switch 550 may be naturally restored. Various press sensitive switches other than the above-described elastic dome switch may be used.

Figure 6:
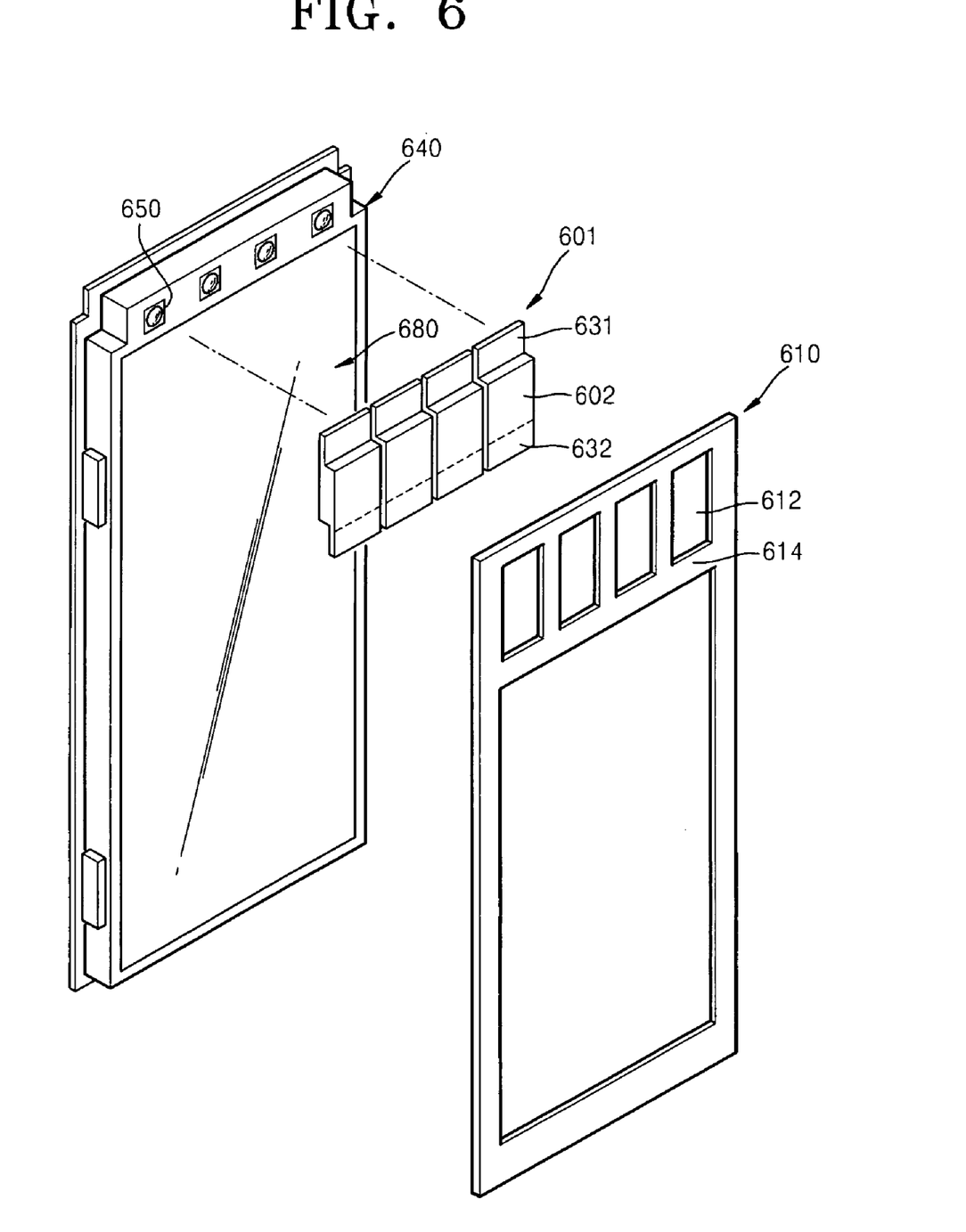
FIG. 6 is an exploded perspective view of a button input apparatus with a display function according to another embodiment of the present invention.

FIG. 6 is an exploded perspective view of a button input apparatus with a display function according to another embodiment of the present invention. According to the current embodiment, lever buttons can include a button pad 610 having a plurality of openings 612 and a plurality of buttons 601 made of a transparent substance and separated individually. First edges 632 of the buttons 601 extend from windows 602 and overlap with one edge 614 of the perimeter of the openings 612 on the front surface of the button pad 610, and second edges 631 located in an opposite position of the first edges 632 extend from the rear surface of the button pad 610 to the outward.

A display panel 680 is disposed below the lever buttons, and a plurality of switches 650 are disposed adjacently to the perimeter of the display panel 680 as in the embodiment of FIG. 5. A switch substrate 640 may be formed as one body with a PCB driving the display panel 680. In this case, the plurality of switches 650 are disposed to respectively correspond to the second edges 631 of the plurality of buttons 601.

Figure 7A:
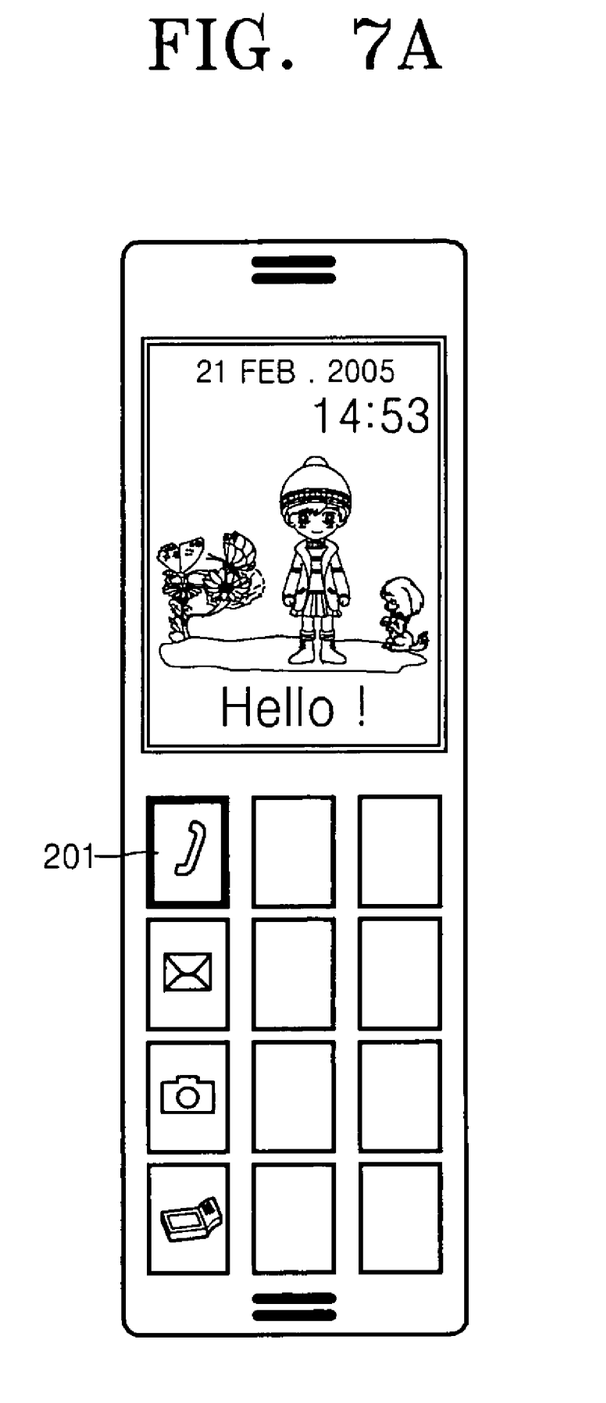
FIGS. 7A and 7B illustrate a portable electronic device having a button input apparatus with a display function according to an embodiment of the present invention.
Figure 7B:
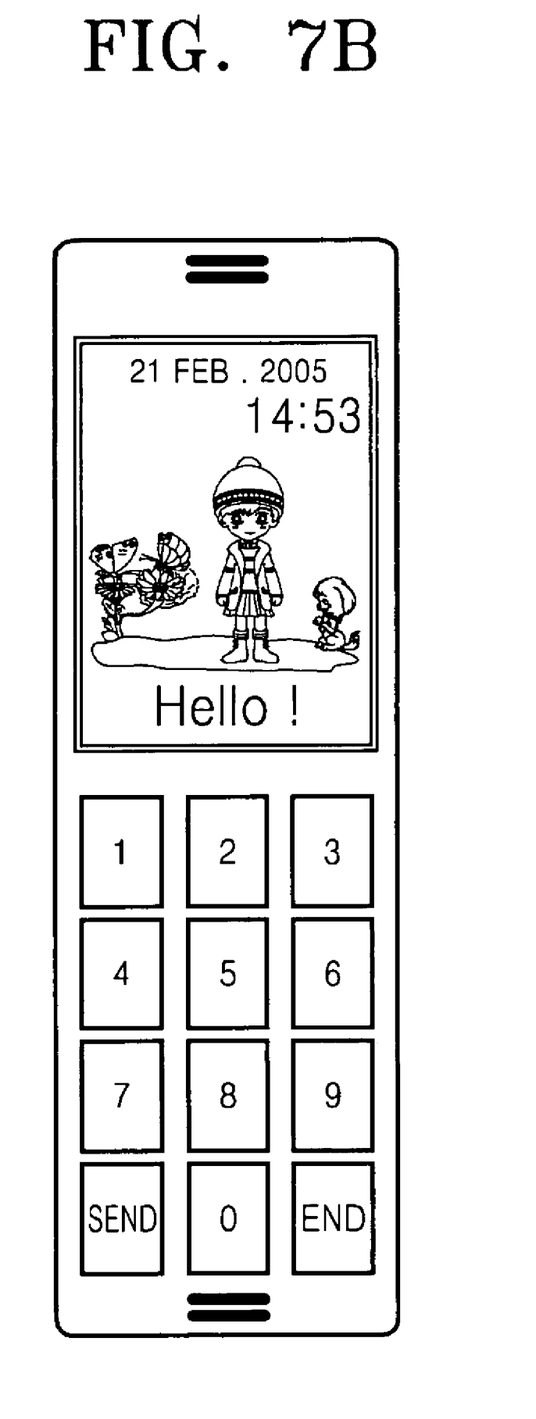

FIGS. 7A and 7B illustrate a portable electronic device, e.g., a mobile communication terminal, having a button input apparatus with a display function according to an embodiment of the present invention. A simple example of displaying a variable image through a window of each button 201 will now be described. If a user presses a button 201 on which an image indicating a phone call function is displayed in an initial mode of the mobile communication terminal illustrated in FIG. 7A, integers from 0 to 9 for inputting a telephone number, an image indicating a call start function, and an image indicating a call end function can be displayed on the buttons 201 as illustrated in FIG. 7B.

According to the above-described embodiments of the present invention, the thickness and the number of parts of a button input apparatus can be significantly reduced while providing a user with a good sense of input. Accordingly, the assembling and manufacturing costs of the button input apparatus with a display function and a portable electronic device having the same can be reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A button input apparatus with a display function, which generates a switch signal in response to a user's press, the apparatus comprising:

a plurality of lever buttons each having a transparent window in at least a portion thereof, and one fixed edge on one side of the transparent window, so that the buttons are elastically vertically flexible;

a switch substrate, which is disposed below the plurality of lever buttons, including openings respectively corresponding to the transparent windows, and generating a switch signal according to a motion of any of the plurality of lever buttons via a plurality of switches disposed to respectively correspond to elastic parts of the lever buttons; and a display panel, which provides an image in an area corresponding to each of the transparent windows, at least a portion of the display panel being disposed below the plurality of lever buttons.

2. The apparatus of claim 1, wherein the plurality of lever buttons comprises:

a plurality of buttons each of which are individually separated; and an elastic plate, which is a plate shaped member disposed below the plurality of buttons and comprises a plurality of elastic parts, a portion of the elastic plate which corresponds to the plurality of buttons being partially cut, and each of the elastic parts having an opening corresponding to each of the transparent windows.

3. The apparatus of claim 2, wherein each of the elastic parts comprises a free edge partially cut along an outline of each of the buttons and a fixed uncut edge, wherein, when the button is pressed, the free edge moves.

4. The apparatus of claim 2, wherein the elastic plate is a metal plate.

5. The apparatus of claim 2, wherein the elastic plate is a plastic plate.

6. The apparatus of claim 1, wherein the plurality of lever buttons comprises a single button plate partitioned into a plurality of button areas, one edge of each of the button areas being the fixed edge and other edges thereof being partially cut.

7. The apparatus of claim 6, wherein the plurality of lever buttons further comprises a button pad, which is disposed below the button plate and has a plurality of openings respectively corresponding to the transparent windows of the plurality of lever buttons.

8. The apparatus of claim 7, wherein a plurality of protrusions respectively corresponding to the plurality of switches is disposed on a rear surface of the button pad.

9. The apparatus of claim 1, wherein the plurality of lever buttons comprises:

a plurality of buttons which are individually separated; and a support structure supporting a fixed edge of each of the plurality of buttons.

10. The apparatus of claim 9, wherein the plurality of lever buttons further comprises a button pad, which is disposed below the plurality of buttons and has a plurality of openings respectively corresponding to the transparent windows of the plurality of lever buttons, and wherein the support structure is a portion of a switch substrate, which is disposed below the button pad and supports parts of the button pad corresponding to the fixed edges of the plurality of buttons.

11. The apparatus of claim 10, wherein a plurality of protrusions respectively corresponding to the plurality of switches is disposed on a rear surface of the button pad.

12. The apparatus of claim 1, wherein the switch substrate is disposed between the plurality of lever buttons and the display panel and has openings respectively corresponding to the transparent windows of the plurality of lever buttons.

13. The apparatus of claim 12, further comprising a reinforcement plate, which is disposed between the switch substrate and the display panel, has openings corresponding to the windows, and protects the display panel by supporting a rear surface of the switch substrate.

14. The apparatus of claim 1, wherein the switch substrate is adjacent to a perimeter of the display panel.

15. The apparatus of claim 14, further comprising a reinforcement structure, which is disposed below the switch substrate and supports a rear surface of the switch substrate.

16. The apparatus of claim 14, wherein the switch substrate is formed in one body with a printed circuit board (PCB) driving the display panel.

17. A portable electronic device comprising:
a plurality of lever buttons each having a transparent window in at least a portion thereof, and one fixed edge so that buttons are elastically vertically biased;
a switch substrate, which is disposed below the plurality of lever buttons, including openings respectively corresponding to the windows, and generating a switch signal according to a motion of any of the plurality of lever buttons via a plurality of switches disposed to respectively correspond to elastic parts of the lever buttons;
a display panel, which provides an image in an area corresponding to each of the transparent windows, at least a portion of the display panel being disposed below the plurality of lever buttons; and
a button display controller displaying images changed according to the switch signal in areas of the display panel corresponding to the transparent windows.

18. The portable electronic device of claim 17, wherein the plurality of lever buttons comprises:
a plurality of buttons which are individually separated; and
an elastic plate, which is a plate shaped member disposed below the plurality of buttons and comprises a plurality of elastic parts, a portion of the elastic plate which corresponds to the plurality of buttons being partially cut, and each of the elastic parts having an opening corresponding to each of the transparent windows.

19. The portable electronic device of claim 18, wherein each of the elastic parts comprises a free edge partially cut along an outline of each of the buttons and a fixed uncut edge, wherein, when the button is pressed, the free edge moves.

20. The portable electronic device of claim 18, wherein the elastic plate is a metal plate.

21. The portable electronic device of claim 18, wherein the elastic plate is a plastic plate.

22. The portable electronic device of claim 17, wherein the plurality of lever buttons comprises a single button plate partitioned into a plurality of button areas, one edge of each of the button areas being the fixed edge and other edges thereof being partially cut.

23. The portable electronic device of claim 22, wherein the plurality of lever buttons further comprises a button pad, which is disposed below the button plate and has a plurality of openings respectively corresponding to the transparent windows of the plurality of lever buttons.

24. The portable electronic device of claim 23, wherein a plurality of protrusions respectively corresponding to the plurality of switches is disposed on a rear surface of the button pad.

25. The portable electronic device of claim 17, wherein the plurality of lever buttons comprises:
a plurality of buttons each of which are individually separated; and
a support structure supporting a fixed edge of each of the plurality of buttons.

26. The portable electronic device of claim 25, wherein the plurality of lever buttons further comprises a button pad, which is disposed below the plurality of buttons and has a plurality of openings respectively corresponding to the transparent windows of the plurality of lever buttons, and
wherein the support structure is a portion of a switch substrate, which is disposed below the button pad and supports parts of the button pad corresponding to the fixed edges of the plurality of buttons.

27. The portable electronic device of claim 26, wherein a plurality of protrusions respectively corresponding to the plurality of switches is disposed on a rear surface of the button pad.

28. The portable electronic device of claim 17, wherein the switch substrate is disposed between the plurality of lever buttons and the display panel and has openings respectively corresponding to the windows of the plurality of lever buttons.

29. The portable electronic device of claim 28, further comprising a reinforcement plate, which is disposed between the switch substrate and the display panel, has openings respectively corresponding to the transparent windows, and protects the display panel by supporting a rear surface of the switch substrate.

30. The portable electronic device of claim 17, wherein the switch substrate is adjacent to a perimeter of the display panel.

31. The portable electronic device of claim 30, further comprising a reinforcement structure, which is disposed below the switch substrate and supports a rear surface of the switch substrate.

32. The portable electronic device of claim 30, wherein the switch substrate is formed in one body with a printed circuit board (PCB) driving the display panel.

* * * * *